(12) United States Patent
Hsu et al.

(10) Patent No.: US 12,479,068 B2
(45) Date of Patent: Nov. 25, 2025

(54) PROBE CLEANING SHEET AND MANUFACTURE METHOD THEREOF

(71) Applicants: Li-Wen Hsu, New Taipei (TW);
Chun-Liang Chen, New Taipei (TW);
Chih-Tang Lee, New Taipei (TW)

(72) Inventors: Li-Wen Hsu, New Taipei (TW);
Chun-Liang Chen, New Taipei (TW);
Chih-Tang Lee, New Taipei (TW)

(73) Assignee: CKT TEK CO., LTD., New Taipei (TW)

( * ) Notice: Subject to any disclaimer, the term of this patent is extended or adjusted under 35 U.S.C. 154(b) by 392 days.

(21) Appl. No.: 18/139,324

(22) Filed: Apr. 25, 2023

(65) Prior Publication Data
US 2024/0359293 A1   Oct. 31, 2024

(51) Int. Cl.
*B24D 11/00*  (2006.01)
*B24D 11/02*  (2006.01)
(Continued)

(52) U.S. Cl.
CPC ............ *B24D 11/001* (2013.01); *B24D 11/02* (2013.01); *B24D 18/0072* (2013.01); *B32B 5/024* (2013.01); *B32B 7/06* (2013.01); *B32B 37/24* (2013.01); *B32B 37/26* (2013.01); *B32B 38/0004* (2013.01); *B32B 38/145* (2013.01); *B32B 2037/243* (2013.01); *B32B 2037/268* (2013.01); *B32B 2038/0076* (2013.01); *B32B 2255/02* (2013.01); *B32B 2255/26* (2013.01); *B32B 2255/28* (2013.01); *B32B 2262/101* (2013.01); *B32B 2305/188* (2013.01); *B32B 2315/085* (2013.01); *B32B 2432/00* (2013.01)

(58) Field of Classification Search
CPC .. B24D 11/001; B24D 11/02; B24D 18/0072; B24D 3/001; B24D 3/002; B24D 3/004; B24D 3/22; B24B 29/08; B32B 5/024; B32B 5/022; B32B 17/04; B32B 37/24; B32B 38/0004; B32B 38/145; B32B 2037/268; B32B 2037/243; B32B 2038/0076; B32B 2255/02; B32B 2255/26; B32B 2255/28; B32B 2262/101; B32B 2305/188; B32B 2315/085; B32B 2432/00
USPC ................................ 451/526, 539, 533, 532
See application file for complete search history.

(56) References Cited

U.S. PATENT DOCUMENTS

| | | | |
|---|---|---|---|
| 2004/0111817 A1* | 6/2004 | Chen | B32B 3/28 15/104.93 |
| 2015/0174736 A1* | 6/2015 | Sathyanarayanaiah | B32B 5/26 428/221 |

FOREIGN PATENT DOCUMENTS

WO    WO-2021217046 A1 * 10/2021 ............. B24D 3/004

* cited by examiner

*Primary Examiner* — Robert F Neibaur (57) ABSTRACT

A probe cleaning sheet and a manufacturing method thereof are provided. The manufacturing method includes material preparing step, first printing step, first baking step, first cooling step, second printing step, second baking step, and second cooling step. The probe cleaning sheet includes a silicone glass fiber cloth layer and an abrasive layer set printed on one side of the silicone glass fiber cloth layer. The silicone glass fiber cloth layer includes a plurality of glass fibers and silicone, the silicone is coated on the surface of the glass fibers and in the gap between the glass fibers. The abrasive layer set includes a high-density abrasive layer printed on one side of the silicone glass fiber cloth layer and a low-density abrasive layer printed on the top surface of the high-density abrasive layer and is opposite to the silicone glass fiber cloth layer.

6 Claims, 10 Drawing Sheets

(51) Int. Cl.
*B24D 18/00* (2006.01)
*B32B 5/02* (2006.01)
*B32B 7/06* (2019.01)
*B32B 37/24* (2006.01)
*B32B 37/26* (2006.01)
*B32B 38/00* (2006.01)

PROBE CLEANING SHEET AND MANUFACTURE METHOD THEREOF

FIELD OF THE DISCLOSURE

The present disclosure relates to a low penetrating probe cleaning sheet and a manufacturing method thereof, and more particularly to the technology applied in the electromechanical field, mainly to the use of cleaning probes.

BACKGROUND OF THE DISCLOSURE

A probe is an inspection tool used to contact the electrodes of various electronic parts and conduct a conduction inspection. For the method of removing the pollutants accumulated on the probe, it is common to use QA natural fiber brush (TBR-1) to gently brush the tip of the probe and then remove the fallen dust particles with a vacuum cleaner or wipe it with a common probe cleaning cloth on the market. However, in the production process of the probe cleaning cloth on the market, the probe cleaning cloth is formed by stacking and adhering different materials layers by glue. In conventional art, the production process of the probe cleaning cloth goes through baking, heating, and cooling. After the above-mentioned baking, heating, and cooling process, the probe cleaning cloth forms a concave, curled shape due to thermal expansion and contraction of its different characteristics from different materials and changes in ductility. When concave and curling occur, gaps between different material layers will lead to air bubbles forming.

In addition to the problems mentioned above, in the conventional production of probe cleaning cloths, the materials used are relatively hard, the production is very time-consuming and labor-intensive, and easily damaged. Therefore, the lack of conventional probe cleaning cloth is a problem to be solved in related industries.

SUMMARY OF THE DISCLOSURE

The main purpose of the present disclosure is to improve the above-mentioned conventional problems and provide a low penetrating probe cleaning sheet that can be produced more quickly and prevent the occurrence of concave, curled, and air bubbles in the finished product.

In order to achieve the object and the advantage mentioned above, the present disclosure provides a method of manufacturing a probe cleaning sheet, including: material preparing step: providing a rolled and formed silicone glass fiber cloth, and cutting the silicone glass fiber cloth into an required size and placing the silicone glass fiber cloth on a printing machine; first printing step: turning on the printing machine, placing the silicone glass fiber cloth on a fixture of the printing machine, and performing high-density printing on one side of the silicone glass fiber cloth, so that a high-density abrasive layer is formed on one side of the silicone glass fiber cloth; first baking step: placing the silicone glass fiber cloth formed with the high-density abrasive layer into a baking machine for a first baking operation to combine the silicone of the silicone glass fiber cloth and the high-density abrasive layer; first cooling step: after the first baking step, placing the silicone glass fiber cloth formed with the high-density abrasive layer into a cooling machine for a first cooling operation; second printing step: after the first cooling step, placing the silicone glass fiber cloth into the printing machine and performing low-density printing on the side of the high-density abrasive layer to form a low-density abrasive layer, so that the high-density abrasive layer is between the low-density abrasive layer and the silicone glass fiber cloth; second baking step: placing the silicone glass fiber cloth into the baking machine for a second baking operation to combine the low-density abrasive layer and the high-density abrasive layer; and second cooling step: after the second baking step, placing the silicone glass fiber cloth into the cooling machine for a second cooling operation, so as to harden the low-density abrasive layer to bond closely with the high-density abrasive layer.

The present disclosure further provides a probe cleaning sheet comprising: a silicone glass fiber cloth layer, including a plurality of glass fibers and silicone, the silicone is coated on the surface of the glass fibers and in the gap between the glass fibers; and an abrasive layer set, printed on one side of the silicone glass fiber cloth layer and including at least one high-density abrasive layer and at least one low-density abrasive layer; wherein the at least one high-density abrasive layer is printed on one side of the silicone glass fiber cloth, and the silicone adheres to the at least one high-density abrasive layer, and the at least one low-density abrasive layer is printed on the top surface of the high-density abrasive layer and is opposite to the silicone glass fiber cloth.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Referring to FIGS. 1-4, firstly, the method of manufacturing a low penetrating probe cleaning sheet of the present disclosure includes step process as follows: material preparing step S1: providing a rolled and formed silicone glass fiber cloth 10, and cutting the silicone glass fiber cloth 10 into an required size and placing the silicone glass fiber cloth 10 on a printing machine 101; first printing step S2: turning on the printing machine 101, placing the silicone glass fiber cloth 10 and performing high-density printing on one side of the silicone glass fiber cloth 10, so that a high-density abrasive layer 20 is formed on one side of the silicone glass fiber cloth 10; first baking step S3: placing the silicone glass fiber cloth 10 formed with the high-density abrasive layer 20 into a baking machine 201 for a first baking operation to combine the silicone 1032 of the silicone glass fiber cloth 10 and the high-density abrasive layer 20; first cooling step S4: after the first baking step S3, placing the silicone glass fiber cloth 10 formed with the high-density abrasive layer 20 into a cooling machine 202 for a first cooling operation; second printing step S5: after the first cooling step S4, placing the silicone glass fiber cloth 10 into the printing machine 101 and performing low-density printing on the side of the high-density abrasive layer 20 to form a low-density abrasive layer 30, so that the high-density abrasive layer 20 is between the low-density abrasive layer 30 and the silicone glass fiber cloth 10; second baking step S6: placing the silicone glass fiber cloth 10 into the baking machine 201 for a second baking operation to combine the low-density abrasive layer 30 and the high-density abrasive layer 20; and second cooling step S7: after the second baking step S6, placing the silicone glass fiber cloth 10 into the cooling machine 202 for a second cooling operation. In detail, the first baking step S3 and the second baking step S6 adopt a two-stages baking operation method.

Figure 1:
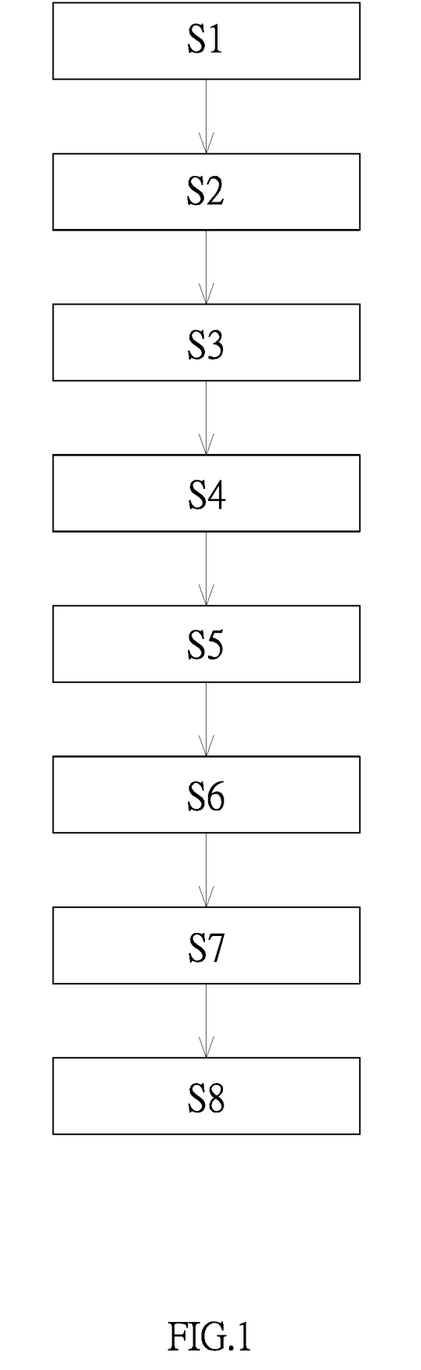
FIG. 1 is a flowchart schematic view of the step of the present disclosure.
Figure 2:
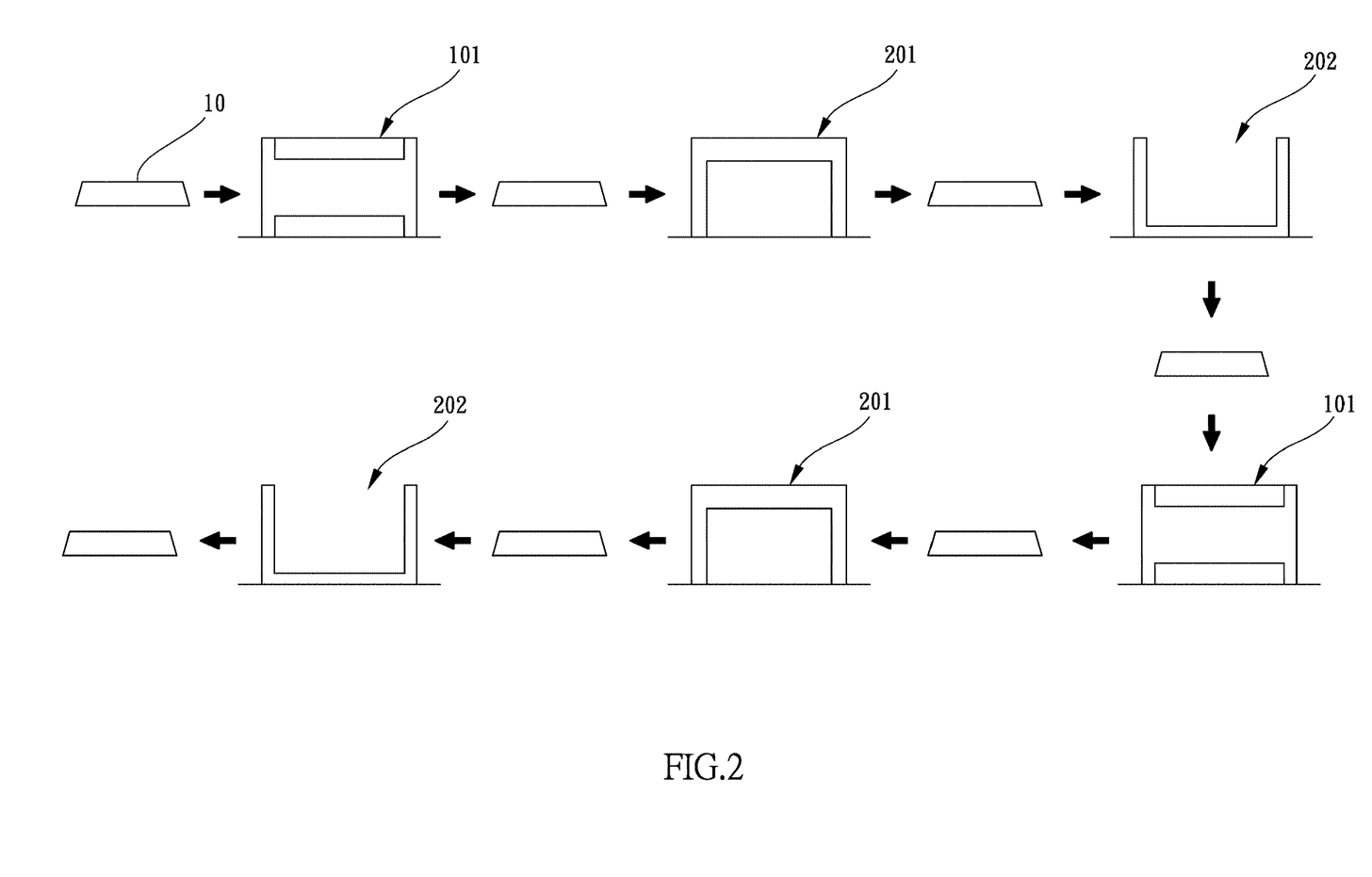
FIG. 2 is a flowchart schematic view of the mechanism of the present disclosure.

In the first stage, pre-baking is carried out first under the condition of 60~70° C. for 5~10 minutes, and the second stage is under the condition of 180~200° C. for 20~30 minutes.

Figure 3:
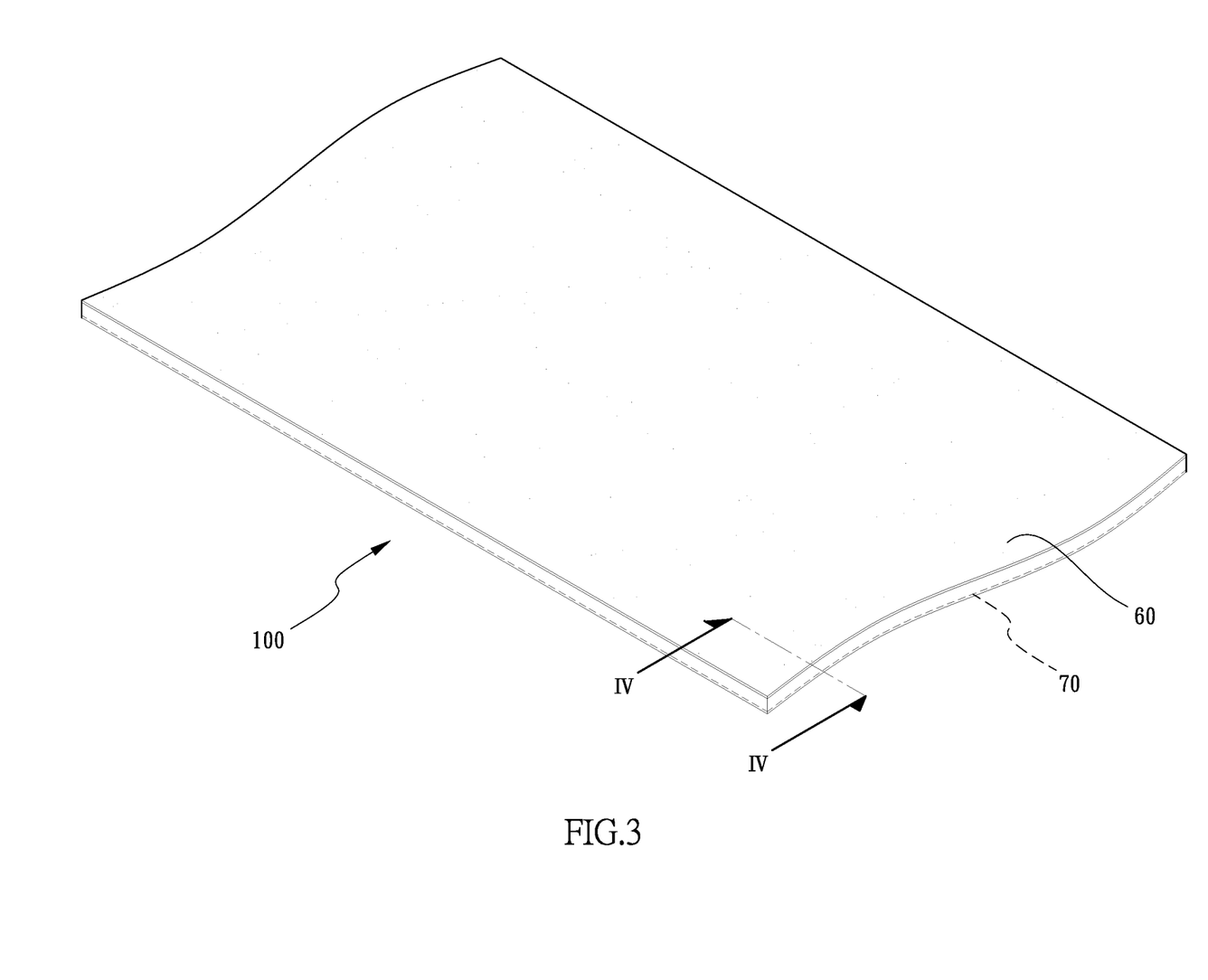
FIG. 3 is a perspective schematic view of a probe cleaning sheet of the present disclosure.
Figure 4:
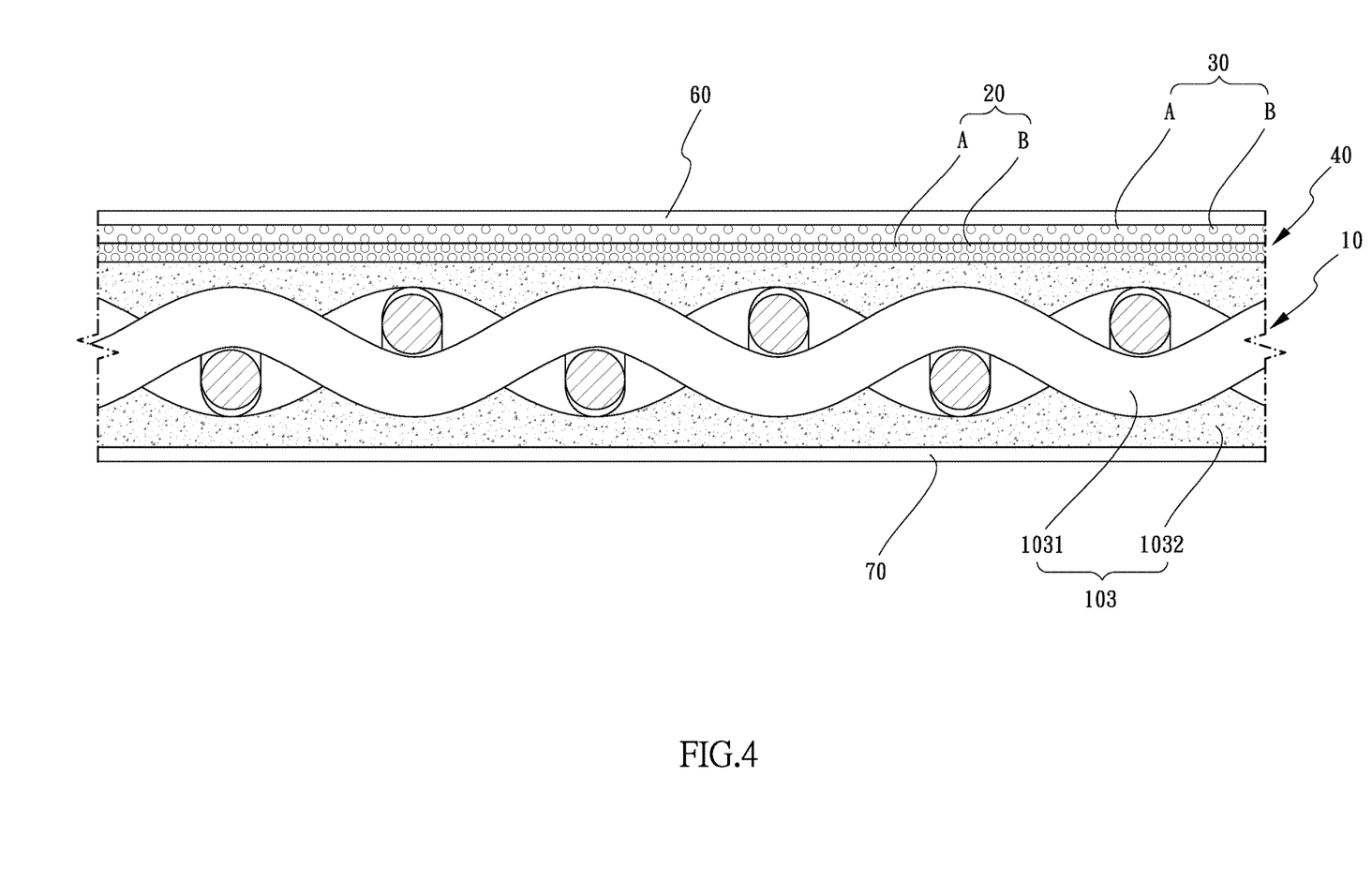
FIG. 4 is a cross-sectional view taken along line IV-IV of FIG. 3.

Moreover, in the part of the structure of the low penetrating probe cleaning sheet, which is to be read in conjunction with the above-mentioned manufacturing method, the probe cleaning sheet 100 includes: a silicone glass fiber cloth layer 103 (that is, the above-mentioned silicone glass fiber cloth 10 to distinguish the definition of the manufacturing method and the structure), including a plurality of glass fibers 1031 and a silicone 1032, the silicone 1032 is coated on the surface of the glass fibers 1031 and in the gap between the glass fibers 1031; and an abrasive layer set 40, printed on one side of the silicone glass fiber cloth layer 103 and including at least one high-density abrasive layer 20 and at least one low-density abrasive layer 30; wherein the at least one high-density abrasive layer 20 is printed on one side of the silicone glass fiber cloth layer 103 and the silicone 1032 adheres to the at least one high-density abrasive layer 20, and the at least one low-density abrasive layer 30 is printed on the top surface of the high-density abrasive layer 20, so that the high-density abrasive layer 20 is between the low-density abrasive layer 30 and the silicone glass fiber cloth 10. In detail, by the printing combination of the silicone glass fiber cloth layer 103 and the abrasive layer set 40, the high tensile strength of the silicone glass fiber cloth layer 103 prevents the probe cleaning sheet 100 from being bent and curled, and the printing method combines the silicone glass fiber cloth layer 103 with the abrasive layer set 40 with less operating time and improves production efficiency.

Based on the above description, the probe cleaning sheet 100 of the present disclosure include the silicone glass fiber cloth 10 (silicone glass fiber cloth layer 103), and the printing combination of the high-density abrasive layer 20 and the low-density abrasive layer 30. Specifically, the silicone glass fiber cloth 10 has the characteristics of high-temperature resistance, corrosion resistance, high tensile strength, high insulation performance, temperature resistance from low temperature to high temperature (−50° C. to 250° C.), chemical corrosion resistance, weather aging resistance, and abrasion resistance. Therefore, during the baking and cooling process of the manufacturing method, the materials will not easily cause concave and curl changes, so that the product of the probe cleaning sheet 100 has better flatness, integrity, and no gaps and bubbles. This way, the tip can be properly cleaned during the probe's operation without affecting the probe's outer surface.

Referring to the manufacturing method of the present disclosure, the high-density abrasive layer 20 can be directly printed on the surface of the silicone glass fiber cloth 10, which will not damage the silicone glass fiber cloth 10. Through the silicone 1032 contained in the silicone glass fiber cloth 10, the high-density abrasive layer 20 can be printed on the silicone glass fiber cloth 10 without adding additional adhesives and the like. Therefore, the problem of thermal expansion and contraction during the temperature change of baking and cooling can be prevented.

The detailed features of the manufacturing method will be described in detail below, which can be read in conjunction with FIG. 4. Firstly, in order to allow the probe cleaning sheet 100 to be accommodated after the production is completed, and to protect its surface when not in use, a surface treatment step S8 is further performed after the second cooling step S7. The surface treatment step S8 includes attaching a back adhesive layer 70 to the side of the silicone glass fiber cloth 10 opposite to the high-density abrasive layer 20. A release film 60 is attached to the surface of the low-density abrasive layer 30, and the release film 60 can be movably torn off from the low-density abrasive layer 30. The purpose of the release film 60 is mainly to avoid the adhesion of foreign matter. When the release film 60 is torn off, the probe tip first punctures the surface of the low-density abrasive layer 30 for grinding and cleaning, and then continues to puncture the high-density abrasive layer 20 for further fine abrasive cleaning. The dirt on the surface of the probe tip can be efficiently scraped off.

Moreover, the silicone 1032 in the silicone glass fiber cloth 10 has its negative charge and lipophilic properties to transfer the dirt of the probe to the abrasive layer set 40 (including the low-density abrasive layer 30 and the high-density abrasive layer 20) and the silicone 1032 of the silicone glass fiber cloth 10. The plurality of glass fibers 1031 of the silicone glass fiber cloth 10 is also used to prevent the probe from being over-pressurized and directly impacting the machine to cause probe tip damage. The back adhesive layer 70 is used for sticking the probe cleaning sheet 100 on the required machine platform.

Figure 5:
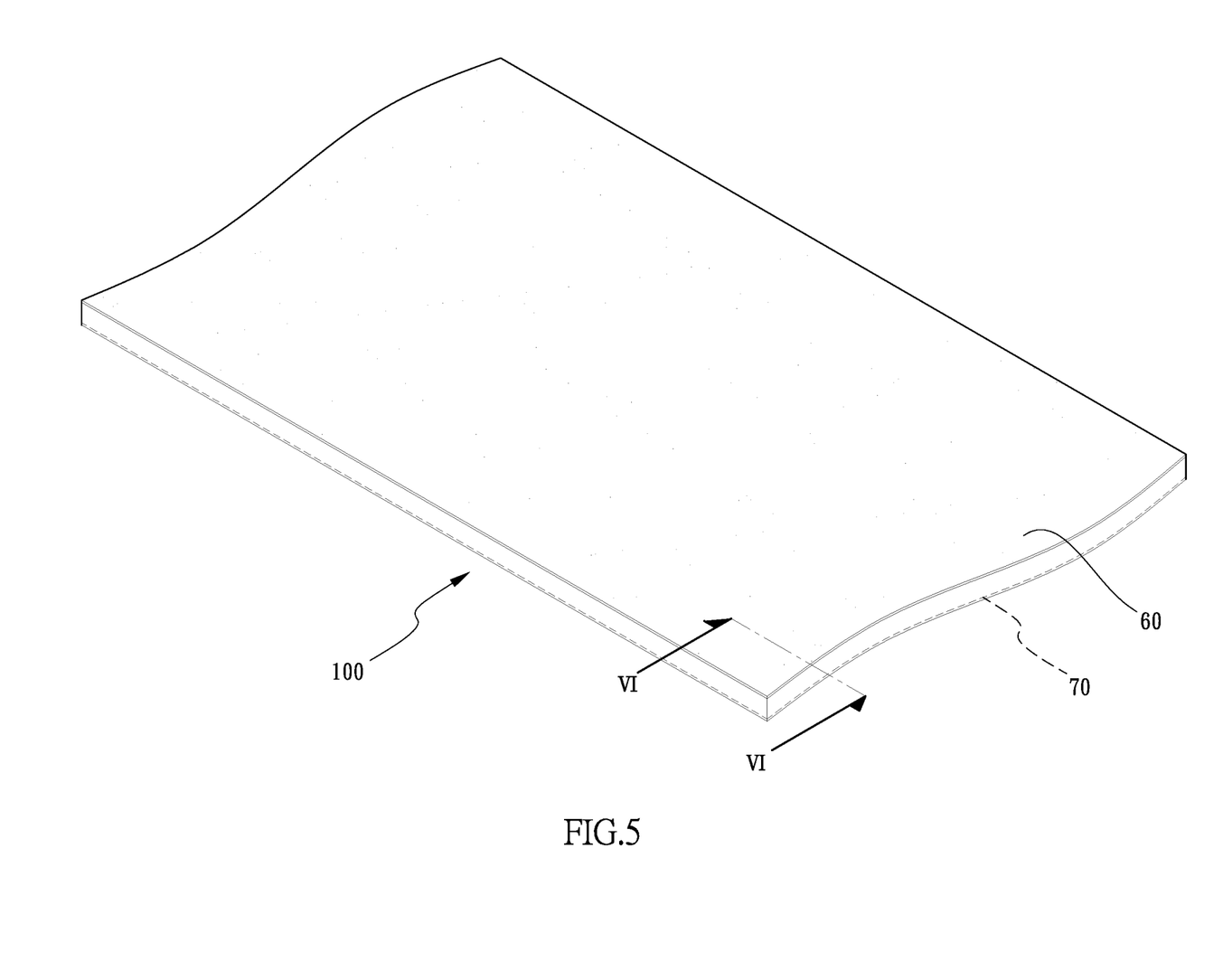
FIG. 5 is a schematic perspective view of another embodiment of the present disclosure.
Figure 6:
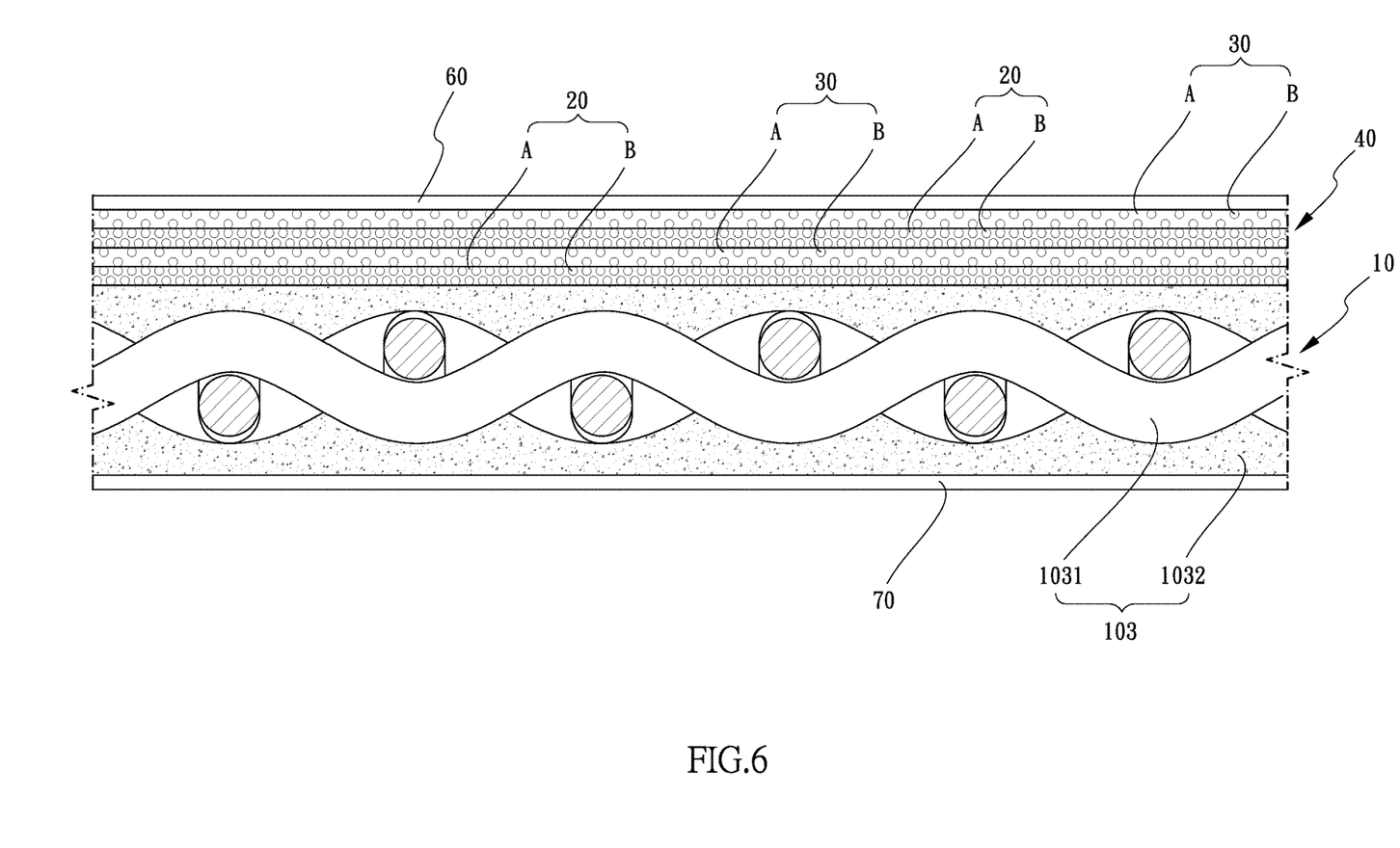
FIG. 6 is a cross-sectional view taken along line VI-VI of FIG. 5 with two of the high-density abrasive layers and two of the low-density abrasive layers.

Further, in forming high-density abrasive layer 20 and low-density abrasive layer 30, a printing pigment is provided in the printing machine 101 of the first printing step S2 and the second printing step S5. The printing pigment mainly includes an ink A and a plurality of abrasive grains B. The plurality of abrasive grains B are added to the ink A, stirring and refrigerating the solvent. The ink A is made of silica gel, the abrasive grain B is spherical alumina, and the diameter of each abrasive grain B is 2~5 μm. In addition, the abrasive grain B should be silicon affinity surface treated to increase the cross-linking force with the ink A, so as to avoid the peeling of the abrasive grain B during use. The difference between the high-density abrasive layer 20 and the low-density abrasive layer 30 is that the distance of the particles between the abrasive grains B in the ink A, the distance between the abrasive grains in the high-density abrasive layer is smaller than the distance between the abrasive grains in the low-density abrasive layer. Therefore, the cleaning effect of the high-density abrasive layer 20 and the low-density abrasive layer 30 on the probe is different, as shown in FIG. 3 and FIG. 5.

The abrasive layer set 40 of the present disclosure includes a high-density abrasive layer 20 and a low-density abrasive layer 30 to strengthen the cleaning effect on probes. In addition to one layer of each of the high-density abrasive layer 20 and the low-density abrasive layer 30, as shown in FIG. 3, multiple layers can also be provided. As shown in FIG. 4 and FIG. 5, the abrasive layer set 40 includes two of the high-density abrasive layers 20 and two of the low-density abrasive layers 30 arranged alternately, so that the multi-layer arrangement can enhance the cleaning effect to the probe cleaning sheet 100. To meet the needs of users, the amount of silicone 1032 in the silicone glass fiber cloth layer 103 can also be adjusted.

Figure 7:
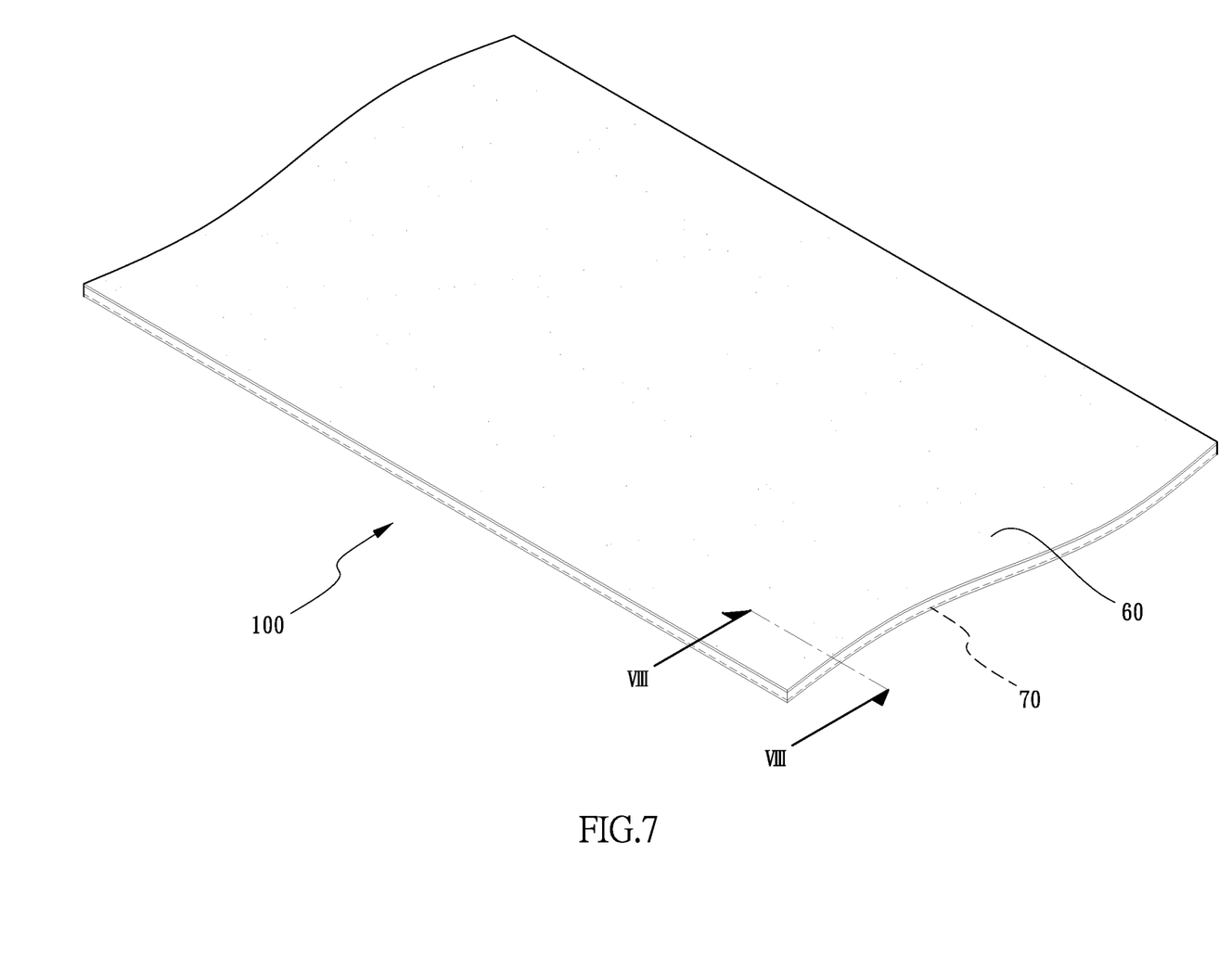
FIG. 7 is a schematic perspective view of another embodiment of the present disclosure.
Figure 8:
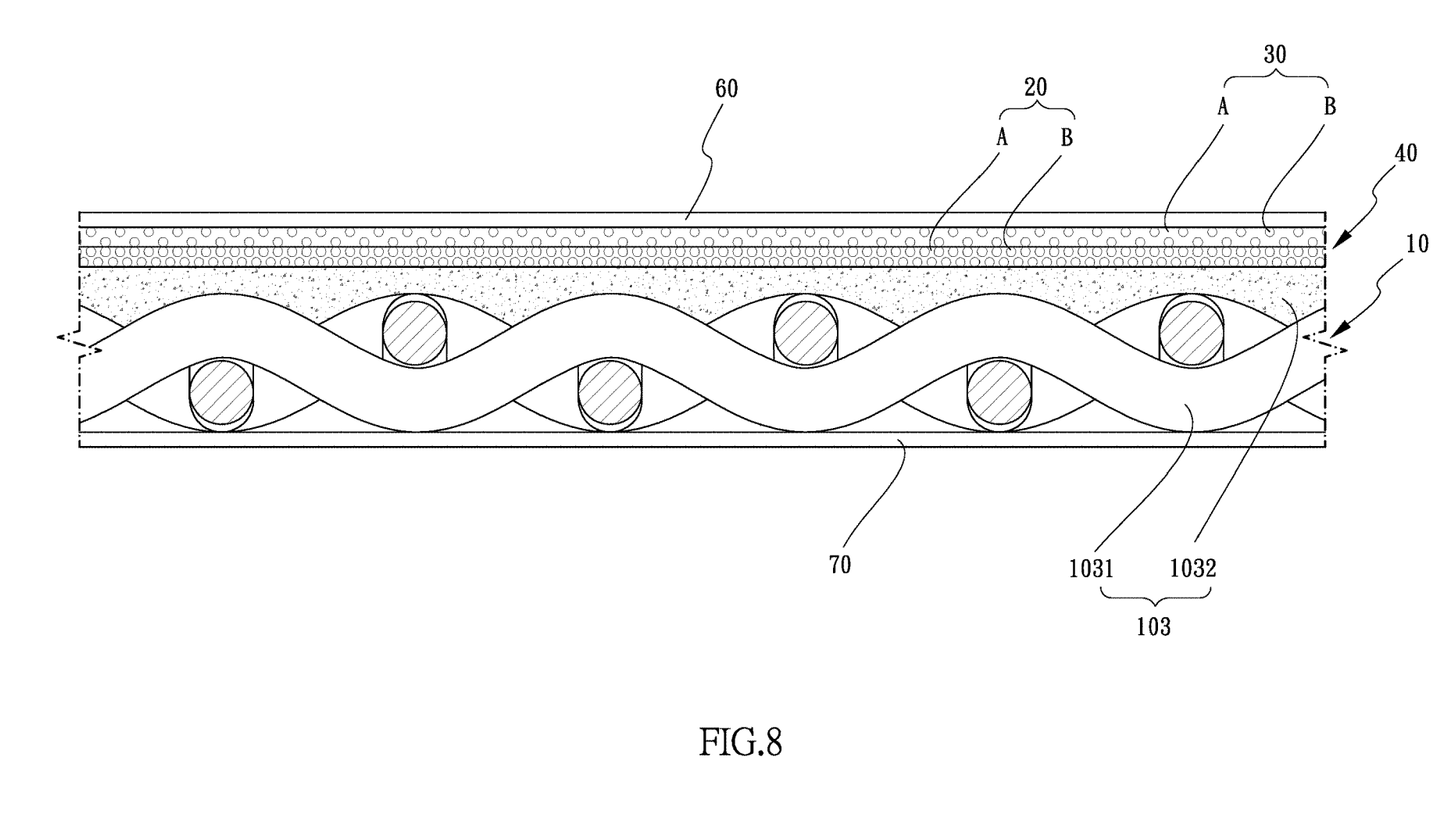
FIG. 8 is a cross-sectional view taken along line VIII-VIII of FIG. 7.
Figure 9:
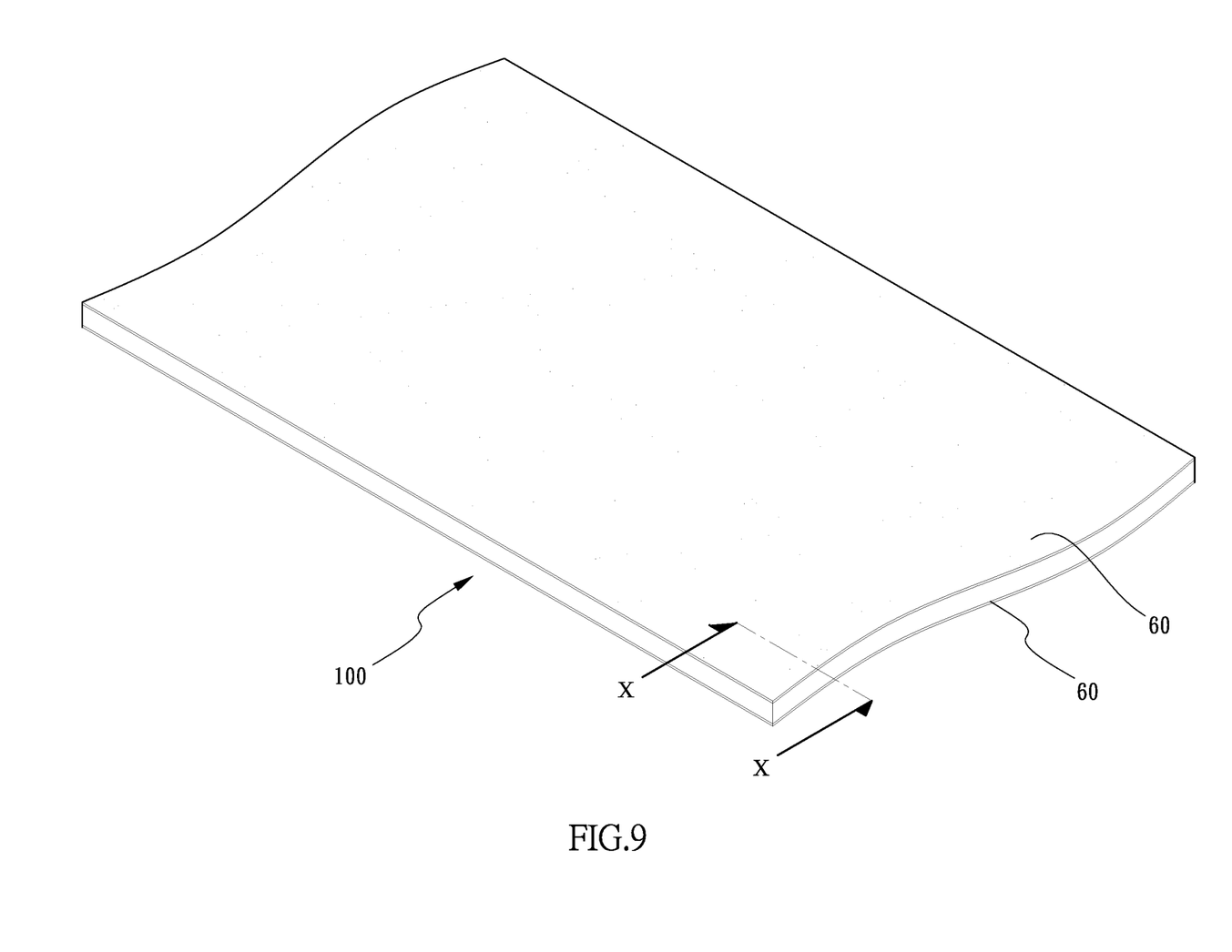
FIG. 9 is a schematic perspective view of another embodiment of the present disclosure.
Figure 10:
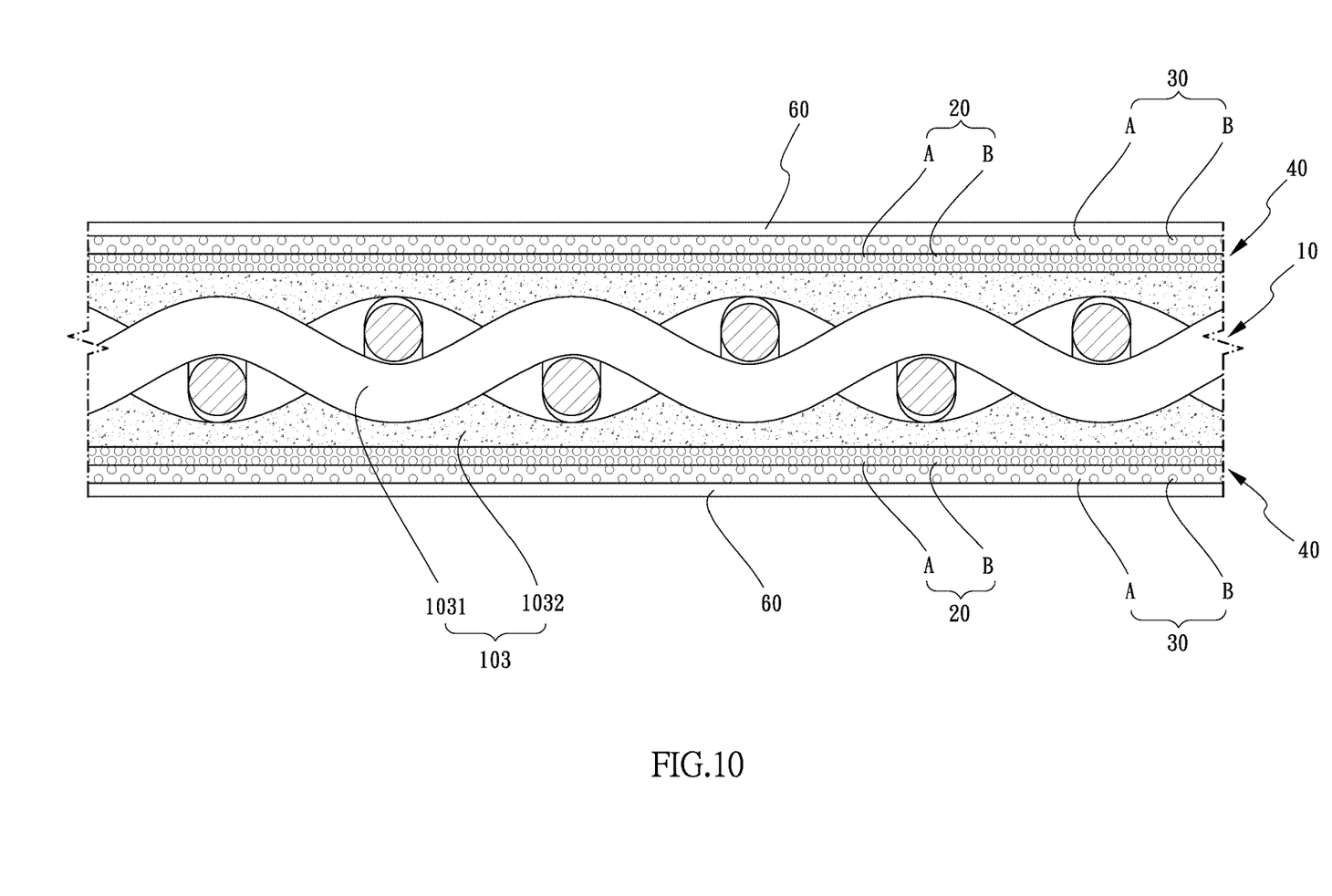
FIG. 10 is a cross-sectional view taken along line X-X of FIG. 9.

As shown in FIG. 4, both the upper and lower layers of the woven glass fibers 1031 contain silicone 1032, and as shown in FIGS. 7-8, the silicone 1032 is only filled on one side of the woven glass fibers 1031, and the back adhesive layer 70 is directly adhered to the other side of the woven glass fibers 1031 according to the required thickness of the probe cleaning sheet 100 by users. Moreover, the upper and lower sides of the woven silicone glass fiber cloth layer 103 are both printed with abrasive layer set 40 (including high-density abrasive layer 20 and low-density abrasive layer 30), and finally covered with a release film 60, as shown in FIGS. 9-10. In this way, the single probe cleaning sheet 100 can be used on both sides.

What is claimed is:

1. A method of manufacturing a probe cleaning sheet, comprising:
    material preparing step: providing a rolled and formed silicone glass fiber cloth, cutting the silicone glass fiber cloth into required size, and placing the cut silicone glass fiber cloth on a fixture of a printing machine;
    first printing step: turning on the printing machine, and performing high-density printing on one side of the cut silicone glass fiber cloth, so that a high-density abrasive layer is formed on one side of the cut silicone glass fiber cloth;
    first baking step: placing the cut silicone glass fiber cloth formed with the high-density abrasive layer into a baking machine for a first baking operation to combine the silicone of the cut silicone glass fiber cloth and the high-density abrasive layer;
    first cooling step: after the first baking step, placing the cut silicone glass fiber cloth formed with the high-density abrasive layer into a cooling machine for a first cooling operation;
    second printing step: after the first cooling step, placing the cut silicone glass fiber cloth into the printing machine and performing low-density printing on the side of the high-density abrasive layer to form a low-density abrasive layer, so that the high-density abrasive layer is between the low-density abrasive layer and the cut silicone glass fiber cloth;
    second baking step: placing the cut silicone glass fiber cloth into the baking machine for a second baking operation to combine the low-density abrasive layer and the high-density abrasive layer; and
    second cooling step: after the second baking step, placing the cut silicone glass fiber cloth into the cooling machine for a second cooling operation.

2. The method of manufacturing probe cleaning sheet according to claim 1, further including a surface treatment step after the second cooling step; wherein the surface treatment step includes applying a treatment agent on a side of the cut silicone glass fiber cloth opposite to the high-density abrasive layer.

3. The method of manufacturing a probe cleaning sheet according to claim 2, further including attaching a release film to the surface of the low-density abrasive layer after the surface treatment step, and the release film can be movably torn off from the low-density abrasive layer.

4. The method of manufacturing a probe cleaning sheet according to claim 3, further including attaching a back adhesive layer to the side of the cut silicone glass fiber cloth opposite to the high-density abrasive layer.

5. The method of manufacturing a probe cleaning sheet according to claim 1, wherein the high-density abrasive layer and the low-density abrasive layer include an ink and a plurality of abrasive grains, the ink and the abrasive grains are stirred and mixed with each other, and the distance between the abrasive grains in the high-density abrasive layer is smaller than the distance between the abrasive grains in the low-density abrasive layer.

6. The method of manufacturing a probe cleaning sheet according to claim 5, wherein the ink is made of silica gel, the abrasive grain is spherical alumina, and the diameter of each abrasive grain is 2~5 um.

* * * * *